Figure 1:
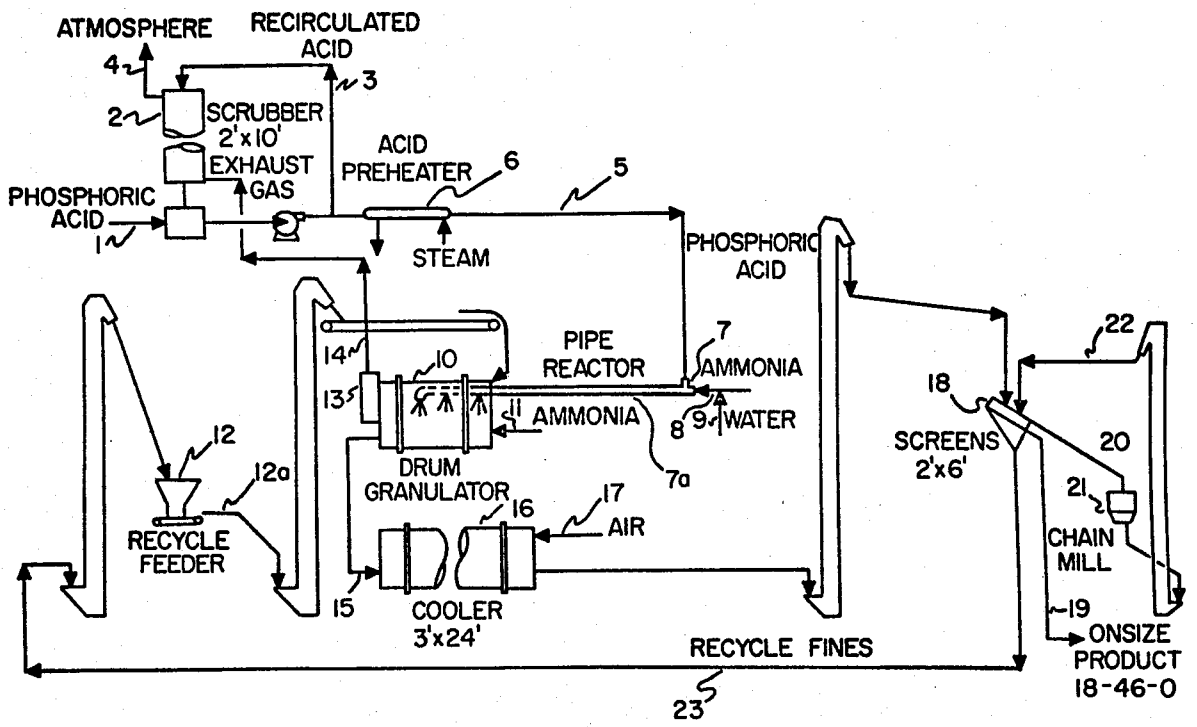
Figure 2:
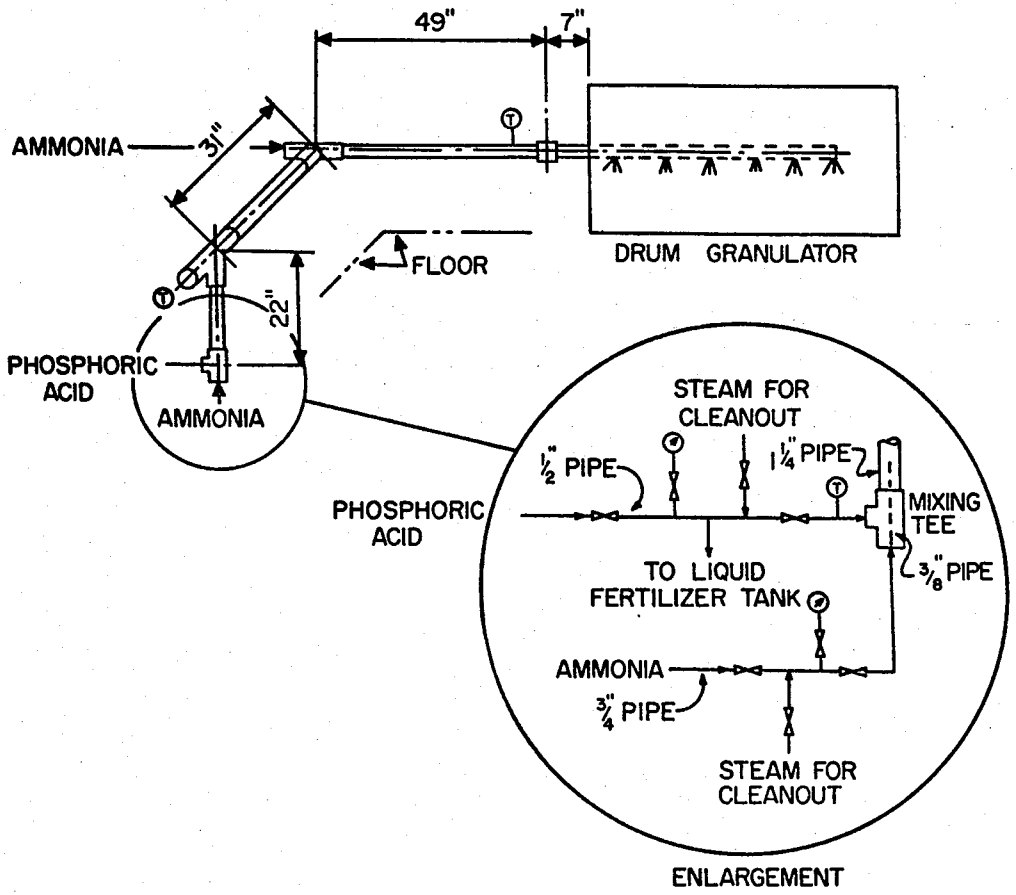
Figure 3:
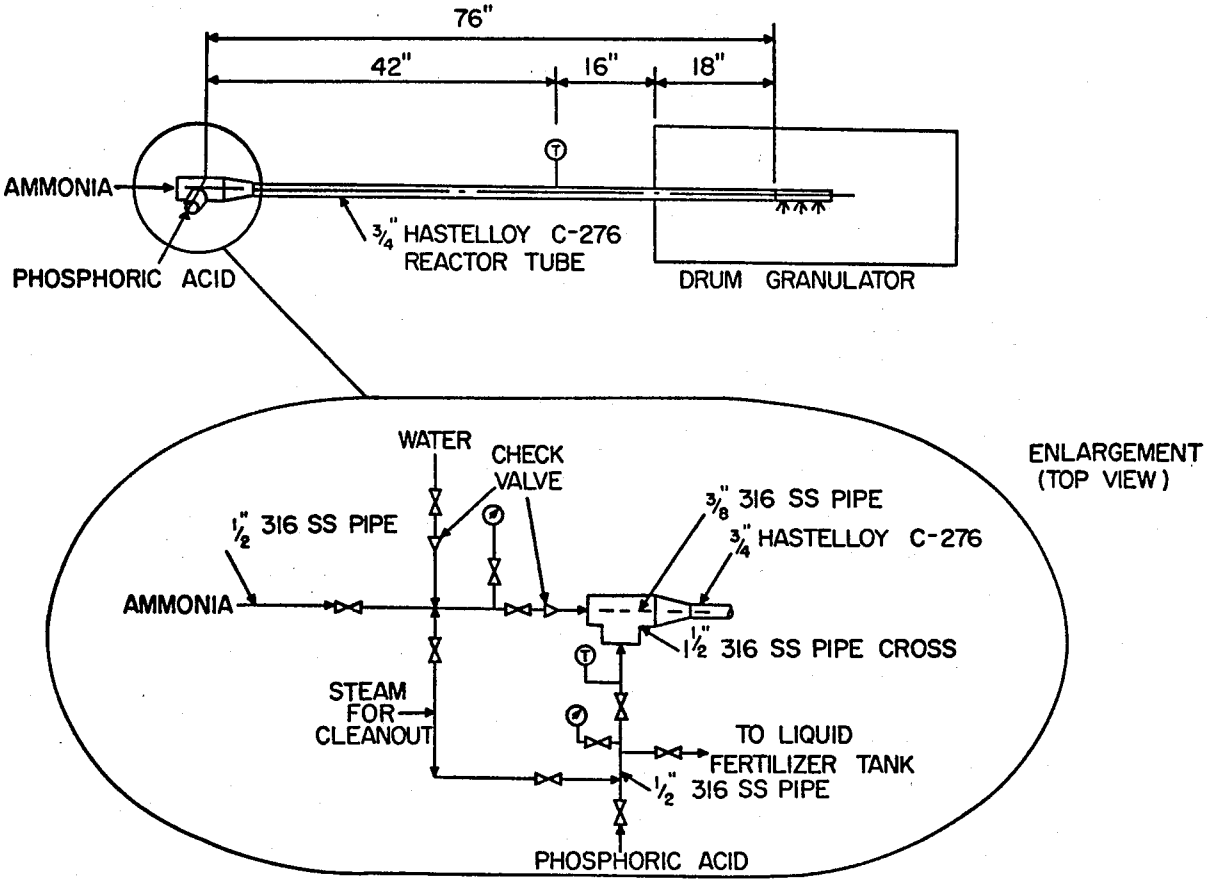
Figure 4:
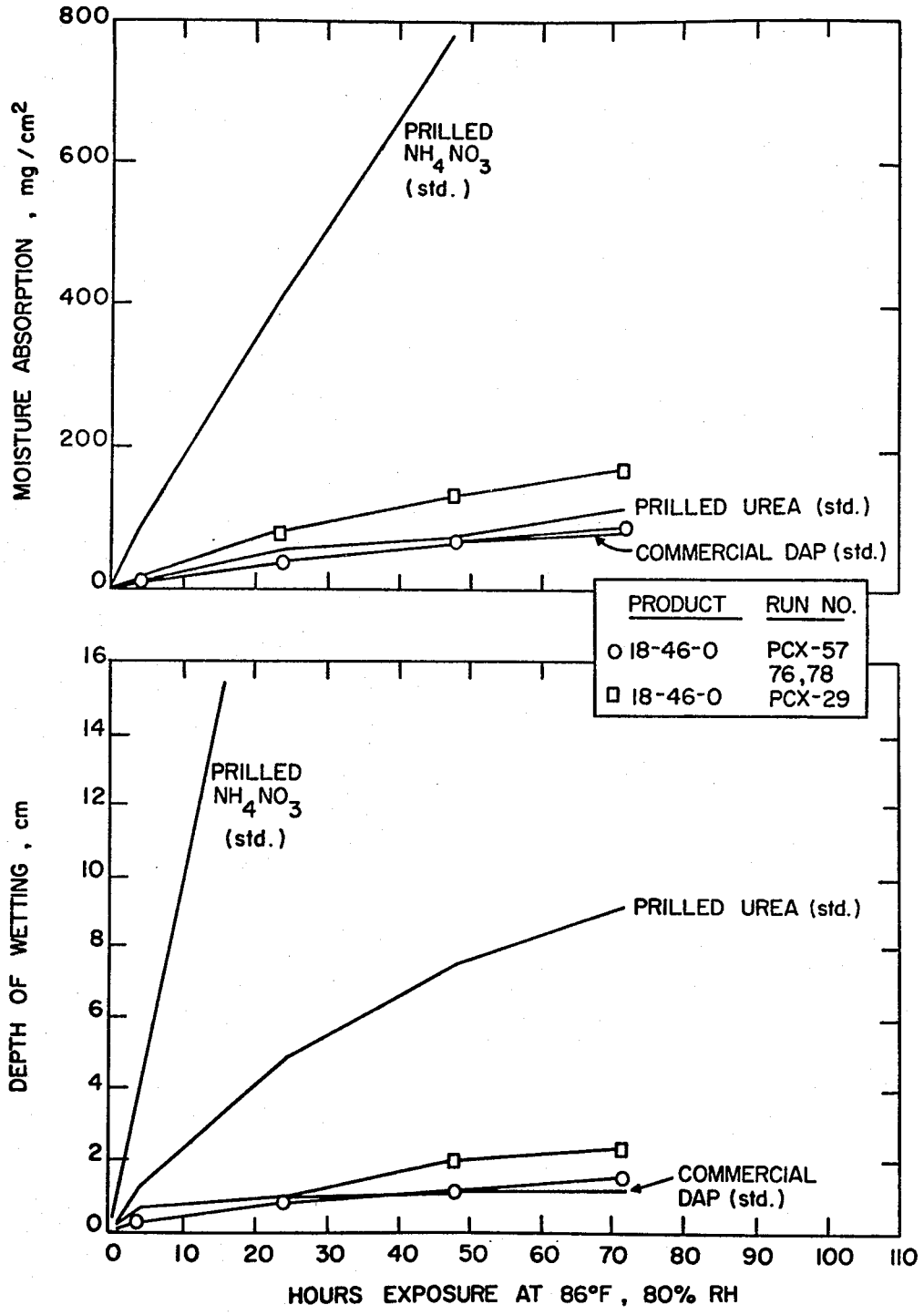

United States Defensive Publication [19] (H) [11] T101,203

Parker et al. [43] Nov. 3, 1981

[54] PROCESS FOR PRODUCTION OF GRANULAR DIAMMONIUM PHOSPHATE

[76] Inventors: Byron R. Parker, Rte. 7, Box 117, Florence, Ala. 35630; Melvin M. Norton, Rte. 1, Virginia Shores, Sheffield, Ala. 35660

[21] Appl. No.: 199,795

[22] Filed: Oct. 23, 1980

[51] Int. Cl.[3] ..... C05B 7/00; C05C 9/00

[52] U.S. Cl. ..... 71/29; 71/34; 71/36; 423/310

[57] ABSTRACT

Process for production of diammonium phosphate from orthophosphoric acid and ammonia. A specially designed inline reactor, a pipe reactor, is used to produce a homogeneous slurry with a lower moisture content than can be produced and pumped utilizing a preneutralizer as used in many prior-art granular fertilizer processes. Because of the lower moisture content of the slurry, drying requirements are eliminated. This eliminates two items of equipment, to wit, a preneutralizer and a dryer, and greatly simplifies pollution abatement since both items are sources of fumes and dust. The equipment utilized in the present process is inexpensive and simple to operate. The products produced are dust-free and of such particle size distribution that they are well suited for subsequent use in producing bulk blends.

6 Claims, 4 Sheets Drawing,

25 Pages Specification

The file of this unexamined application may be inspected and copies thereof may be purchased (849 O.G. 1221, Apr. 9, 1968).

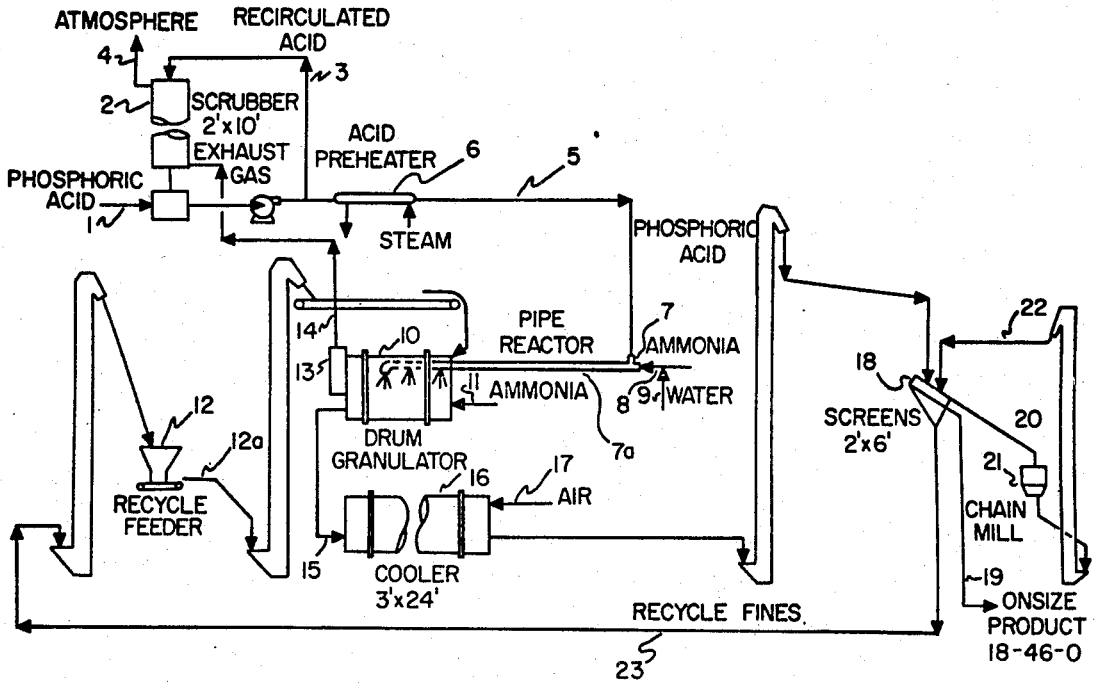

FLOW DIAGRAM OF GRANULATION PILOT-PLANT FOR PRODUCTION OF DIAMMONIUM PHOSPHATE USING THE PIPE REACTOR

FLOW DIAGRAM OF GRANULATION PILOT-PLANT FOR PRODUCTION OF DIAMMONIUM PHOSPHATE USING THE PIPE REACTOR

CONFIGURATION OF PILOT-PLANT PIPE REACTOR

CONFIGURATION OF PILOT-PLANT PIPE REACTOR

RESULTS OF LABORATORY EXPOSURE-PENETRATION TEST OF TVA PILOT-PLANT DIAMMONIUM PHOSPHATES